Sept. 25, 1962 A. A. MARTIN 3,055,227
ACCUMULATOR
Filed July 6, 1961
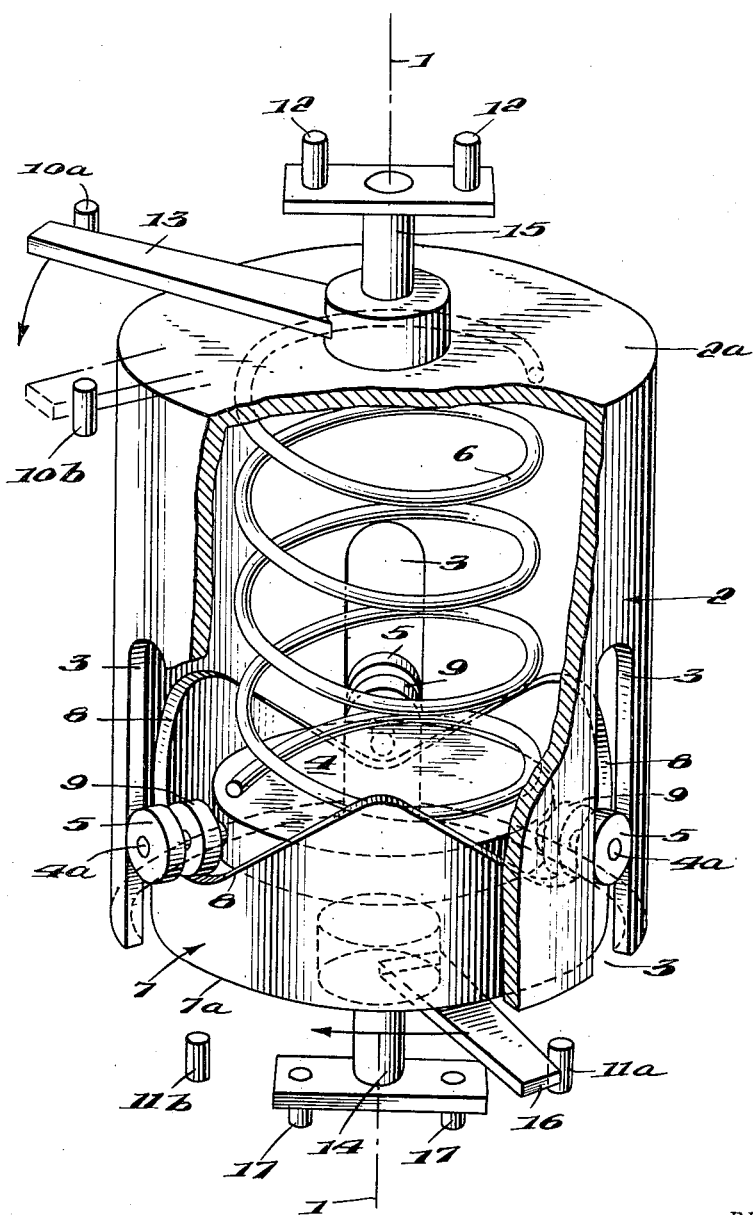
INVENTOR
Andre Martin
BY Pierce, Scheffler & Parker
ATTORNEYS

United States Patent Office 3,055,227
Patented Sept. 25, 1962

3,055,227
ACCUMULATOR
Andre Alfred Martin, Lausanne, Switzerland, assignor to Aktiengesellschaft Brown, Boveri & Cie, Baden, Switzerland, a joint stock company
Filed July 6, 1961, Ser. No. 122,290
Claims priority, application Switzerland July 8, 1960
1 Claim. (Cl. 74—97)

The present invention relates to force storing mechanisms, i.e. an accumulator, and which is particularly well suited for use in conjunction with devices for changing the taps on electrical transformer apparatus.

For changing or shifting the taps on the windings of electrical transformers, it is known to use step-switching devices which are driven by remotely controlled motor drives. These motor drives function to shift or advance the stepping switch mechanism in a step-by-step manner in response to command. The movement of the load shifter and possibly also the movement of the step selector occurs indirectly through the motor with the aid of an accumulator. Tap shifting must proceed in a short time and, once released, must not be stopped. Thus, the accumulator has the function to transform a constant to and fro drive movement into a sudden rotary movement for the drive of the load switch.

These accumulators can be installed in the transformer tank together with the load switch and step selector. A compact assembly of the stepping switch and load shifter with the accumulator and with the drive motor is necessary due to limitations in the space available. It is particularly advantageous if the input drive and the output drive are arranged along the same axis.

The invention thus relates to an accumulator for transforming a constant uniform to and fro rotary drive movement into a sudden rotary driven movement. Both rotary movements, i.e. the input driving movement and the output driven movement, occur along the same axis.

In accordance with the invention there is provided a first tubular cylindrical member which is arranged for rotation about the cylinder axis. The wall of this cylindrical member is provided with a plurality, e.g. three slots arranged parallel to the axis of cylinder rotation and they are uniformly distributed 120° apart about that axis. A star plate is arranged within the cylindrical member in a plane normal to the cylinder axis for movement longitudinally of the axis and is provided with the same number of rolls likewise distributed 120° apart about the axis and which are individual to and displaceable within the slots in the cylindrical member. A helical spring member is arranged for compression within the cylindrical member between an end wall of the latter and the star plate, and a second tubular cylindrical member is arranged for rotation within the first cylindrical member and coaxially therewith, this second cylindrical member having its peripheral edge provided with three roll-off edges extending in wave form and having corresponding points thereon distributed 120° apart and on which run three other rolls on the star plate likewise distributed 120° apart. At least the second cylindrical member is provided with stops which limit its rotation.

The invention will be further explained in conjunction with a specific embodiment thereof and which is illustrated in the accompanying drawing, the single FIGURE of which is a view in perspective, with certain portions cut-away.

With reference now to the drawing, the improved accumulator is seen to be comprised of a first tubular cylindrical member 2 provided with an end plate 2a and which is mounted for rotation about the cylinder axis 1. A shaft 15 is secured to the cylindrical member 2 in order to effect a rotational movement of the latter and this shaft is mounted in suitable bearings, not illustrated. For driving shaft 15 in rotation, a coupling member is provided thereon and which includes a pair of pins 12 which are adapted to be interconnected with complementary elements for an input drive, not shown. The cylindrical member 2 is open at the opposite end and a plurality, e.g. three axis-parallel slots 3, uniformly spaced 120° apart about the cylinder axis extend from this latter end. Located within the cylindrical member 2 is a star plate 4 arranged in a plane normal to the cylinder axis 1 and which is provided with three rolls 5 rotatable on shafts 4a extending radially from the cylinder axis 1 and which are likewise spaced 120° apart and located respectively in the three slots 3. Thus, the arrangement of the star plate 4 relative to the cylindrical member 2 is such that the rolls 5 and hence, star plate 4 are enabled to move but only longitudinally of the cylinder axis 1. Between the underface of end plate 2a and the upper face of star plate 4 a helical spring 6 is arranged, and this spring will be compressed to store energy within the same as the star plate 4 is moved closer to the end plate 2a.

Located with the cylindrical member 2 at the end containing the slots 3 and arranged co-axially therewith is a second tubular cylindrical member 7 likewise provided with an end plate 7a to which is secured a shaft 14 arranged coaxially with shaft 15. Shaft 14 is also mounted for rotation in a bearing assembly, not illustrated, and includes a coupling member thereon provided with a pair of coupling pins 17 which are adapted to be interconnected with complementary elements for an output drive, also not shown. The tubular cylindrical member 7 is open at the end opposite end plate 7a and the peripheral edge of the wall at this end is characterized by three roll-off edge portions 8 extending in wave form around the periphery and distributed 120° apart. The radially extending shafts 4a on star plate 4 are provided with a second set of three rolls 9 located inwardly from rolls 5 and which roll respectively on each of three sets of uniformly spaced convergent inclined roll-off edge portions 8. The force stored in spring 6 always acts in a downward direction as viewed in the drawing thus causing rolls 9 to be pressed into continuous engagement with the roll-off edges 8, thus to bring the star plate 4 into a defined position normal to the axis of rotation.

Shaft 15 is provided with a radially extending lever arm 13 rigidly secured thereto which is permitted a limited rotational movement about the axis 1 through an angle determined by the spacing of a pair of stops 10a, 10b. Similarly, shaft 14 is provided with a radially extending lever arm 16 rigidly secured thereto which is permitted a limited rotational movement about axis 1 through an angle determined by the spacing of a pair of stops 11a, 11b. Since lever arms 13 and 16 have a limited rotational displacement so also limited will be the rotational displacement of shafts 15, 14 and the cylindrical members 2 and 7.

The improved accumulator structure operates in the following manner.

When from the driving side, the cylindrical member 2 is rotated by the coupling member and its pins 12 such that lever arm 13 moves counter-clockwise in the direction indicated by the arrow from stop 10a towards stop 10b, then the rolls 5 and hence, the star plate 4 are taken along with it. Rolls 9 are also taken along and run up inclined portions of roll-off edges 8 of the inner cylindrical member 7 which, at such time must remain stationary since lever 16 abuts against stop 11a. As the rolls 9 run up the edges 8, the star plate 4 will be raised, being guided in such movement by the guiding movement of rolls 5 in their respective slots 3, and thus spring 6 will be further compressed, storing energy into the same.

Thus, the work involved in rotating the cylindrical member 2 counter-clockwise is stored as potential energy in spring 6. As soon as lever 13 has reached stop 10b, each of the rolls 9 will have exceeded the highest point on each of their respectively associated wave-shaped roll-off edge portions 8 and hence, will now be on descending portions of such edges. From this moment on, as a result of the compression built up in spring 6, the force stored in the latter is then freed to act downwardly through rolls 9 thus causing a torque to be suddenly exerted on the cylindrical member 7 with the result that from the abutment at stop 11a, lever 16 will be rotated suddenly in the clockwise direction indicated by the arrow to stop 11b. At the same time, there occurs through the coupling pins 17 a rotation of the driven device, not shown, coupled therewith. Thus, the whole mechanism functions as an accumulator. Due to the relatively slow starting at the input at coupling pins 12, there occurs at first a gradual accumulation of force in the compression spring 6, whereupon at the end of the rotation and the resulting tensioning in spring 6, the energy thus stored in the latter can be delivered suddenly at the output drive coupling pins 17. The turning can also run its course in the reverse direction.

In a reverse manner, the input drive may occur at the coupling pins 17 and the output drive will then be delivered at the coupling pins 12.

A principal advantage of the improved accumulator construction which has been described is that the input drive shaft and the output drive shaft lie on the same axis. One shaft may be designed as a hollow shaft and the other shaft installed therein in a concentric manner.

I claim:

In an accumulator structure for transforming a constant to and fro rotary driving movement into a corresponding sudden rotary driven movement, the combination comprising a first tubular cylindrical member arranged for rotation about the cylinder axis, the wall of said cylindrical member being provided with three elongated slots spaced 120° apart about the cylinder axis and which extend parallel with said axis, a plate member disposed within said first cylindrical member in a plane normal to the cylinder axis, said plate being provided with three roll sets of two rolls each spaced 120° apart about the axis of said first cylinder, one roll of each roll set being located respectively in each of said slots to establish a relative longitudinal guided movement therebetween, a helical spring arranged in compression between a transverse wall of said first cylindrical member and a face of said plate, a second tubular cylindrical member arranged concentric with said first cylindrical member, said second cylindrical member having an edge thereof provided with three sets of uniformly spaced convergent inclined surfaces extending around the periphery thereof, the other three rolls of said roll sets being arranged in rolling engagement respectively with said three sets of inclined surfaces, rotatable drive shafts secured respectively to said first and second cylindrical members, one of said drive shafts being an input drive shaft and the other being an output drive shaft, and stop means provided for at least the drive shaft secured to said second cylindrical member to limit driven rotation of the latter as well as to hold the latter against rotation while said rolls move upward along said inclined surfaces upon rotation of said first cylindrical member.

References Cited in the file of this patent
UNITED STATES PATENTS
2,410,631    Chilton et al. _____ Nov. 5, 1946